United States Patent [19]
Dinh

[11] Patent Number: 5,333,470
[45] Date of Patent: Aug. 2, 1994

[54] BOOSTER HEAT PIPE FOR AIR-CONDITIONING SYSTEMS

[75] Inventor: Khanh Dinh, Alachua, Fla.

[73] Assignee: Heat Pipe Technology, Inc., Alachua, Fla.

[21] Appl. No.: 698,165

[22] Filed: May 9, 1991

[51] Int. Cl.$^5$ ............... F25J 1/00; F28D 15/02; F25B 5/04

[52] U.S. Cl. .................. 62/333; 62/90; 62/95; 62/119; 62/173; 165/104.14; 165/140

[58] Field of Search .......... 62/90, 95, 333, 119, 62/173; 165/104.14, 66, 140

[56] References Cited

U.S. PATENT DOCUMENTS

| | | | |
|---|---|---|---|
| 2,093,725 | 9/1937 | Hull | 62/90 |
| 2,691,488 | 10/1954 | Ghai | 165/66 |
| 4,333,520 | 6/1982 | Yanadori et al. | 62/333 |
| 4,607,498 | 8/1986 | Dinh | 62/185 |

Primary Examiner—Albert W. Davis, Jr.
Attorney, Agent, or Firm—Foley & Lardner

[57] ABSTRACT

An air conditioning system uses heat-pipes in combination with a cooling coil to increase either the dehumidification capacity or the efficiency and capacity of an air-conditioning system. In the dehumidification mode, the secondary cooling coil is inactive, and the heat pipes operate as a heat exchanger between the warm return air and the cold supply air of the air conditioning system to precool the return air and reheat the supply air, increasing the latent capacity of the main cooling coil. In the efficiency and capacity boosting mode, the secondary cooling coil is activated by introducing a portion of the cooling fluid from the air-conditioning system. This results in a neutralization of the effect of the heat pipes as well as an increase in effective heat-exchange area between the cooling fluid and the air, therefore produces an increase in the capacity of the system. In the case of a direct expansion system, the evaporation temperature and pressure of the air-conditioning system are increased by the augmentation of the heat-exchange capacity of the evaporators, resulting in improved thermodynamic efficiencies as well as cooling output capacity. This ability to control the air-conditioning system for maximum dehumidification or maximum cooling efficiency and capacity allows a closer match with the variable load demands for a minimum energy requirement.

4 Claims, 6 Drawing Sheets

BOOSTER HEAT PIPE FOR AIR-CONDITIONING SYSTEMS

BACKGROUND OF THE INVENTION

The present invention relates to an air-conditioning system and more particularly relates to an air conditioning system having heat pipes which increase the dehumidification capacity or the capacity and efficiency of the system.

Air conditioning requirements differ greatly with variations in geographic location, weather conditions, building design, human occupancy, etc. In order to respond to such variations, an air conditioning system must be capable of responding to a wide range of cooling loads and widely different sensible heat ratios (SHR). In general, the heaviest loads with the highest SHR usually occur on hot, sunny days (hot and dry hours), while higher latent loads occur during cooler, more humid hours such as in the early morning and evening hours or following a rain (cool and humid hours). During these cool and humid hours, the load on the building is somewhat lower than in the hot and dry hours. However, air-conditioning is still needed to remove sufficient moisture from the air to reduce the humidity to comfortable levels.

It is known to use a single over-sized air conditioner for both hot and dry hours and for cool and humid hours. The typical system utilizes an air conditioner that is sufficiently large to provide cooling during the hot and dry hours and to provide dehumidification during cool and humid hours by over-cooling the air. However, though the resulting air is sufficiently dehumidified, it is also uncomfortably cool. The excessively cooled air must then be reheated by a heater to comfortable levels. This process is extremely inefficient since the air conditioner must be run excessively to dehumidify the air and since even more energy must be expended to reheat the over-cooled air.

It is also known that in order to obtain higher efficiencies, the most common practice in designing air conditioners is to raise the evaporation temperatures by using an oversized evaporator coil. However, higher evaporator temperatures drastically reduce the ability of the coil to condense moisture from the air. On the other hand, using a smaller evaporator operating at lower temperatures increases the moisture condensing capacity of the system, but results in a loss of efficiency and cooling capacity.

In order to increase the dehumidification capability of air-conditioning systems, passive heat-pipe heat exchangers have been proposed which increase the dehumidification capacity of the system without employing a supplemental heater to reheat the air. One such system is disclosed in U.S. Pat. No. 4,607,498, which issued to Khanh Dinh on Aug. 26, 1986, the subject matter of which is incorporated herein by reference. With reference to FIG. 1, this system includes a housing 12 having an inlet 14, an outlet 16, and a blower 20 which draws air through the housing in a direction indicated by arrow 22. A coil 24 is disposed in the housing. This coil can be either an evaporator or chilled water coil or a condenser or hot water coil depending on whether the system is being used for heating or cooling.

A heat pipe heat exchanger 26 is also provided in the housing to provide for added dehumidification during cool and humid hours. The heat pipe heat exchanger comprises an evaporator coil 28 located upstream of coil 24 and a condenser coil 30 located downstream of coil 24. The coils may have internal rifling or microgrooves acting as wicks. Evaporator 28 has a vapor outlet 32 which is connected through tubing 34 to a vapor inlet 36 of condenser coil 30. A liquid refrigerant outlet 38 of condenser coil 30 is connected through tubing 40 to a liquid inlet 42 of evaporator 28.

In operation, when member 24 acts as an evaporator so that system functions as an air-conditioner, liquid refrigerant disposed in evaporator 28 absorbs heat from air flowing over the evaporator and vaporizes, while concurrently cooling the air. The vaporized refrigerant rises out of the evaporator 28 and enters the condenser coil 30. Air, which has been additionally cooled and dehumidified via contact with evaporator 24, removes heat from the vaporized refrigerant in condenser 30 so that the air is warmed to a more comfortable level while condensing the refrigerant in condenser 30. The liquid refrigerant then flows back into the evaporator 28 through the tube 40, where the cycle is repeated.

If the member 24 is used as a condenser so that the system functions as a heater, the air flowing into the evaporator 28 will be cooler than the air flowing out of condenser 30. Accordingly, the vaporization/condensation cycle of the heat pipe heat exchanger 26 will not occur, and the exchanger 26 will not affect the temperature of the air or the dehumidification capacity of the system.

It can thus be seen that the heat pipe heat exchanger increases the dehumidification capacity of the system during cool and humid hours by precooling the air entering the evaporator 26 so that the air exiting evaporator is further cooled and thus further dehumidified, and then reheats the over-cooled air exiting the evaporator 26 to a comfortable level. The dehumidification capacity is enlarged by lowering the operating temperature of the evaporator at a cost of a decrease in the overall capacity and efficiency of the system. The higher latent capacity and lower total capacity are desirable during cool and humid hours, but are not desirable during hot and dry hours since the maximum cooling capacity of the system is required to cool the hot air and since less dehumidification capacity is required to dehumidify the relatively dry air. It is therefore desirable to neutralize the effect of the heat-pipe heat exchanger while air-conditioning during hot and dry hours.

One possible way of neutralizing the effect of a heat pipe heat exchanger is to interrupt the flow of the working fluid to the heat pipes, for example through the use of a solenoid valve in the line connecting the condenser coil to the evaporator coil. Although this solution would work, it requires a separate valve for each circuit, thereby increasing the complexity of the cost of the system if multiple circuits are used in the system.

Moreover, since there is little appreciable pressure difference within the heat-pipe exchanger system, a special valve must be used which can be activated without a pressure differential. This type of valve is much more expensive than a conventional pilot-actuated valve which utilizes a pressure differential across the valve to aid in the switching operation.

Moreover, when the heat-pipes are deactivated in this manner, both the condenser coil and the evaporator coil are de-energized, performing no useful work for the system. If, on the other hand, the heat pipes are used as a secondary evaporator, the system could have extra evaporator capacity and can operate at a higher evaporation temperature and pressure, resulting in increased efficiency and capacity.

SUMMARY OF THE INVENTION

It is therefore an object of the invention to provide an apparatus having a device which reliably neutralizes at least the reheat portion of a heat pipe heat exchanger of an air conditioning system.

Another object of the invention is to provide a neutralization device which boosts the capacity and efficiency of an air conditioning system by increasing the evaporation pressure and temperature.

Still another object of the invention is to provide an add-on booster heat pipe heat exchanger which can be retrofitted into the duct work of an existing air conditioning system or into the air conditioning system itself to increase the dehumidification capability or the capacity and efficiency of the system.

Still another object of the invention is to provide a neutralization device which is inexpensive to produce.

In accordance with one aspect of the invention, an apparatus includes a housing having an inlet and an outlet, a blower which draws air through the housing from the inlet to the outlet, and a primary evaporator which is located within the housing and which cools the air as the air flows through the housing. A heat pipe heat exchanger comprises an evaporator which is located between the inlet and the primary evaporator and which cools the air before the air is cooled by the primary evaporator, and a condenser which is located between the primary evaporator and the outlet and which reheats the air after the air is cooled by the primary evaporator. In addition, a controllable neutralizing device is provided which, when actuated, neutralizes at least the condenser of the heat pipe heat exchanger.

In accordance with one alternative aspect of the invention, the neutralizing device comprises a secondary evaporator which is located between the condenser and the outlet and which is connected to the condenser by fins which provide a thermal bond between the condenser and the secondary evaporator.

In accordance with another alternative aspect of the invention the neutralizing device comprises a secondary evaporator which is located between the condenser and the outlet and which is detached from the condenser to form a separate unit.

In accordance with yet another alternative aspect of the invention, the heat pipe heat exchanger further comprises a line connecting an outlet of the evaporator to an inlet of the condenser, and the neutralizing device comprises a heat exchanger which is in thermal contact with the line. The heat exchanger may comprise an annular heat exchanger which surrounds a supply conduit filled with refrigerant. The annular heat exchanger has an inlet connected to a portion of the line which leads to the outlet of the evaporator and an outlet connected to a portion of the line which leads to the inlet of the condenser.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being had to the accompanying drawings in which like reference numerals represent like parts throughout, and in which.

DETAILED DESCRIPTION OF THE PREFERRED EMBODIMENTS

Figure 1:
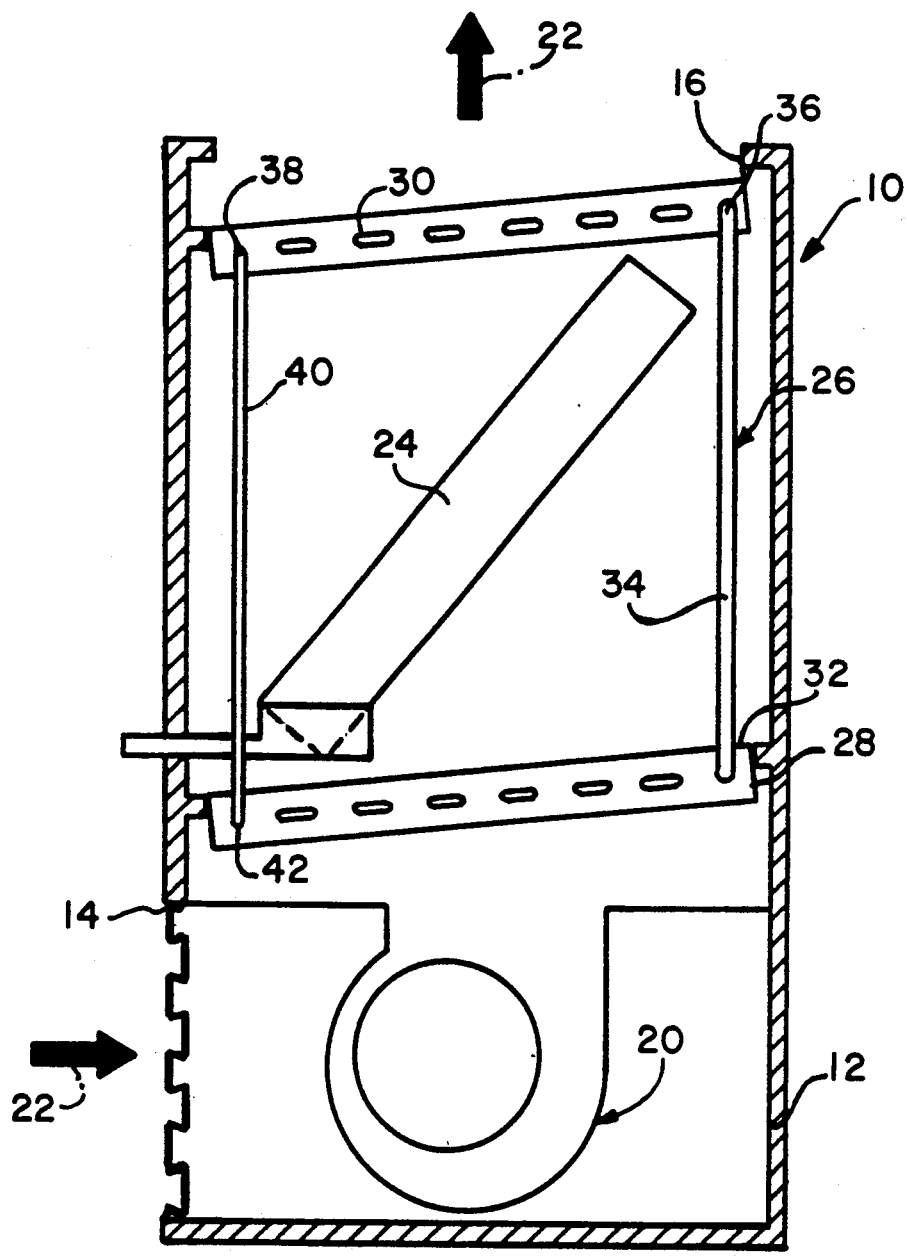
FIG. 1 is a schematic elevation view, shown partially in cross-section, of a portion of prior art air conditioning system.

Referring to FIGS. 2-5, a portion of a heat pipe dehumidification system 100 is shown, which system includes a housing 102 having an inlet 104 and an outlet 106. A blower 108 draws ambient air into the housing 102 from inlet 104 and forces treated air, i.e. heated or cooled and dehumidified air, out of the housing via outlet 106. The direction of airflow through the housing is indicated generally by arrows 110.

Air flowing through the housing 102 is heated or cooled by an element 112 which acts as a condenser when the system is being used as a heater and as an evaporator when the system is used as an air conditioner. Since the instant invention is concerned primarily with the use of the system as an air conditioner, element 112 will hereafter be referred to as a primary evaporator, although it could also be a chilled water coil. In this case, refrigerant, e.g. the fluorocarbon refrigerant commonly sold under the tradename Freon ®, is admitted through primary evaporator 112 via an expansion device 118 connected to a branch 114 of an inlet conduit 116 connected to a condenser, and then flows back to the compressor through conduits 120 and 122.

A heat pipe heat exchanger 124 is provided to increase the dehumidification capacity of the system during cool and humid hours. The heat pipe heat exchanger includes a coil forming an evaporator 126 located upstream of the primary evaporator 112, a coil forming a condenser 128 located downstream of the evaporator, and conduits 130 and 132 which transport vaporized refrigerant from evaporator 126 to condenser 128 and liquified refrigerant from the condenser 128 to the evaporator 126, respectively.

The heat pipe heat exchanger 124 operates as follows:

Warm air enters the housing 102 from the inlet 104 and is cooled slightly as it passes over evaporator 126, thereby vaporizing the liquified refrigerant present in the evaporator. The air then passes over the primary evaporator 112, where it is cooled further. Meanwhile, the vaporized refrigerant rises out of the evaporator 126, through conduit 130, and into condenser 128, where it is cooled by air exiting the primary evaporator 112 so that it is liquefied while simultaneously reheating the air. The liquified refrigerant then flows downwardly into the inlet of evaporator 126 via sloped conduit 130, and the process is repeated.

In a typical operation, air enters the system at a temperature of about 80° F., is cooled to about 75° F. by the evaporator 126, is cooled further to about 55° F. by the primary evaporator 112, and is reheated to about 60° F. by condenser 128. It can thus be seen that the construction and operation of the heat pipe heat exchanger 124 are essentially identical to that disclosed by U.S. Pat. No. 4,607,498. Further details of the heat pipe heat exchanger, such as the manner in which the serpentine coils of the condenser and evaporator are fitted in the fins, have been omitted for the sake of simplicity and can be found in U.S. Pat. No. 4,607,498.

While the operation described above provides satisfactory results when performed during cool and humid hours in which the maximum cooling capacity of the system is not needed, the efficiency of the system decreases significantly during hot and dry hours when maximum capacity is required, since the condenser 128 reheats the cooled air, thus decreasing the cooling capacity of the system. In order to eliminate this problem, a device is provided which neutralizes at least the reheat function of the heat pipe heat exchanger.

Figure 2:
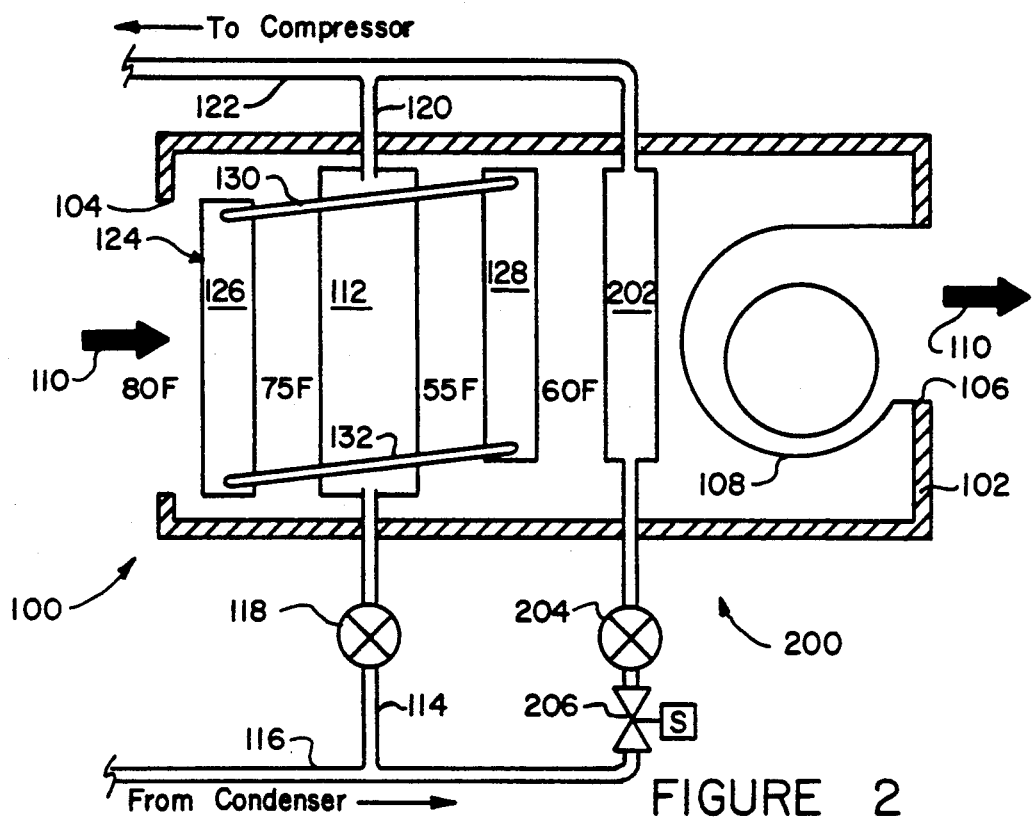
FIG. 2 is a schematic elevation view, shown partially in cross-section, of a first embodiment of the invention.

Referring to FIG. 2, one such neutralization device 200 comprises a secondary evaporator 202 which is connected to inlet conduit 116 via an expansion device 204 and a solenoid valve 206. An outlet of secondary evaporator 202 is connected to the outlet conduit 122 leading to the compressor. The secondary evaporator, when activated through the actuation of solenoid valve 206, operates to re-cool the air exiting condenser 128 to a temperature which is more desirable for satisfying the load demand of the system. For example, if air leaves evaporator 112 at a temperature of 55° F. and is heated to a temperature of 60° F. in condenser 128, the secondary evaporator 202 cools the air to a temperature of 55° F. Of course, if the operator wishes to resume normal operation of the heat pipe heat exchanger 124, the secondary evaporator 202 can be deactivated simply by de-energizing solenoid valve 206, thereby cutting off the flow of liquid refrigerant to the secondary evaporator 202.

The provision of valve 206 in a pressurized line enables the use of a conventional pilot activated solenoid valve since there is a sufficient pressure differential across the valve to actuate the valve. In addition, by providing a valve which does not directly interfere with the flow of refrigerant through the heat pipe heat exchanger 124, the system enables the use of a single valve which is connected to a plurality of evaporators 202, each of which would neutralize the effects of a separate heat pipe heat exchanger. Although the valve 206 has been illustrated as a pilot actuated valve located upstream of an expansion device 204, any valve and pressure source which is capable of providing coolant upon request could be used in place of the described assembly.

Figure 3:
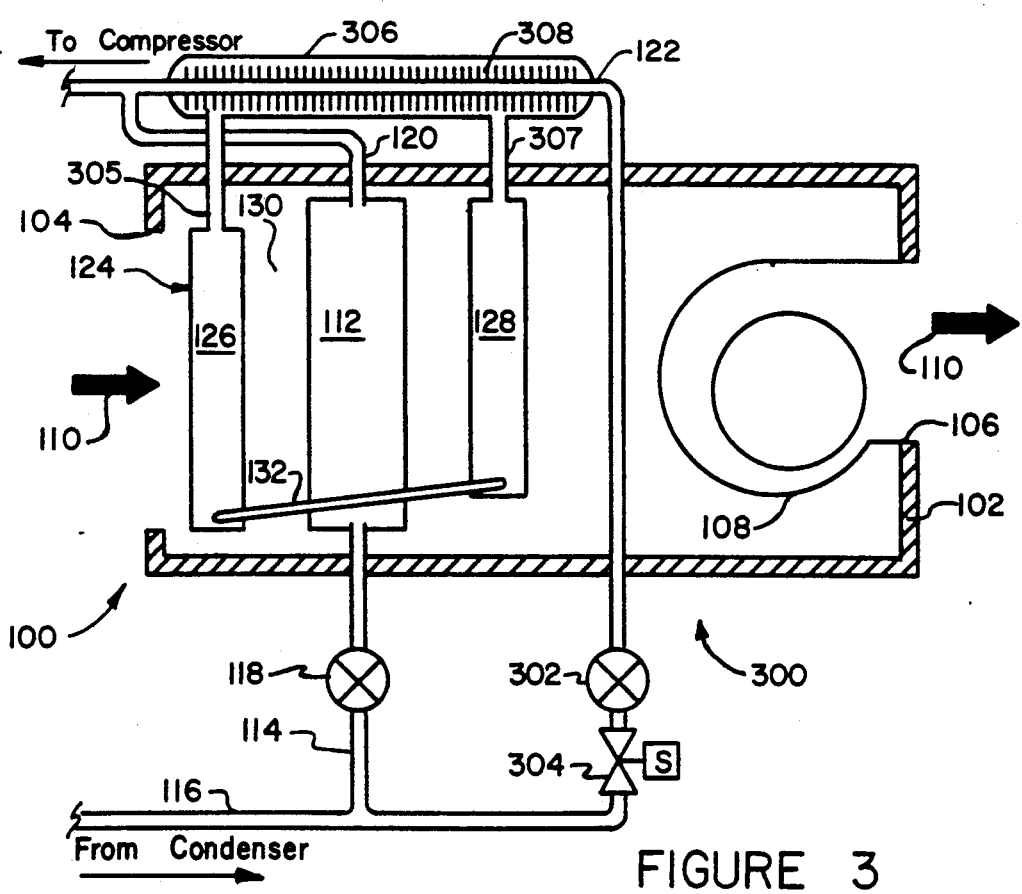
FIG. 3 is a schematic elevation view, shown partially in cross-section, of a second embodiment of the invention.

A second way of neutralizing the effects of the condenser 128 on the air flowing through the system 100 is to use the heat-pipe heat exchanger itself as a neutralizing element. To this end, the device 200 of the first embodiment can be replaced with a device 300 which is illustrated in FIG. 3. This device includes a heat exchanger 306 which connects the evaporator 126 and the condenser 128 to one another via lines 305 and 307 and which thermally connects the lines with a portion of conduit 122.

In this embodiment, upon actuation of a solenoid valve 304, liquid refrigerant is admitted into the conduit 122 and through the center of annular heat exchanger 306 by an expansion device 302. The solenoid valve 304 is identical in construction and operation to the valve 206 of the first embodiment, and can also be connected to a plurality of heat exchangers. The relatively cold refrigerant cools the vaporized refrigerant in heat exchanger 306 so that the refrigerant condenses before entering condenser 128 via line 307. Although the illustrated example includes an annular heat exchanger having fins 308 which enhance heat transfer in the heat exchanger 306, the annular heat exchanger 306 could be replaced with a serpentine heat exchanger or any other device which allows the transfer of heat from the refrigerant being withdrawn from evaporator 126 to the refrigerant in conduit 122 without contact.

In operation, air entering the housing 102 will first be cooled by evaporator 126 and will then be cooled further by primary evaporator 112. Meanwhile, refrigerant in evaporator 126, having been vaporized by the warm air, rises into heat exchanger 306 via line 305, where it transfers heat to refrigerant in conduit 122 and is condensed. The liquid refrigerant then flows through line 307, condenser 128, conduit 132, and back into the evaporator 126. Since the liquid refrigerant entering condenser 128 is cooler than the air exiting primary evaporator 112, contact between the air and the condenser actually cools the air further. As in the first embodiment, normal operation of the heat pipe heat exchanger can be resumed by de-energizing solenoid valve 304 so that no heat exchange takes place in heat exchanger 306.

For example, if air enters the system at 80° F., and is cooled to approximately 75° F. by the evaporator 126, only enough refrigerant needs to be admitted through primary evaporator 112 to cool the air exiting the evaporator to about 60° F., since the air will be further cooled to its optimal temperature of 55° F. by condenser 128. It can thus be seen that the heat pipe heat exchanger 126, 128, in combination with the heat exchanger 306, become a secondary cooling coil.

Figure 4:
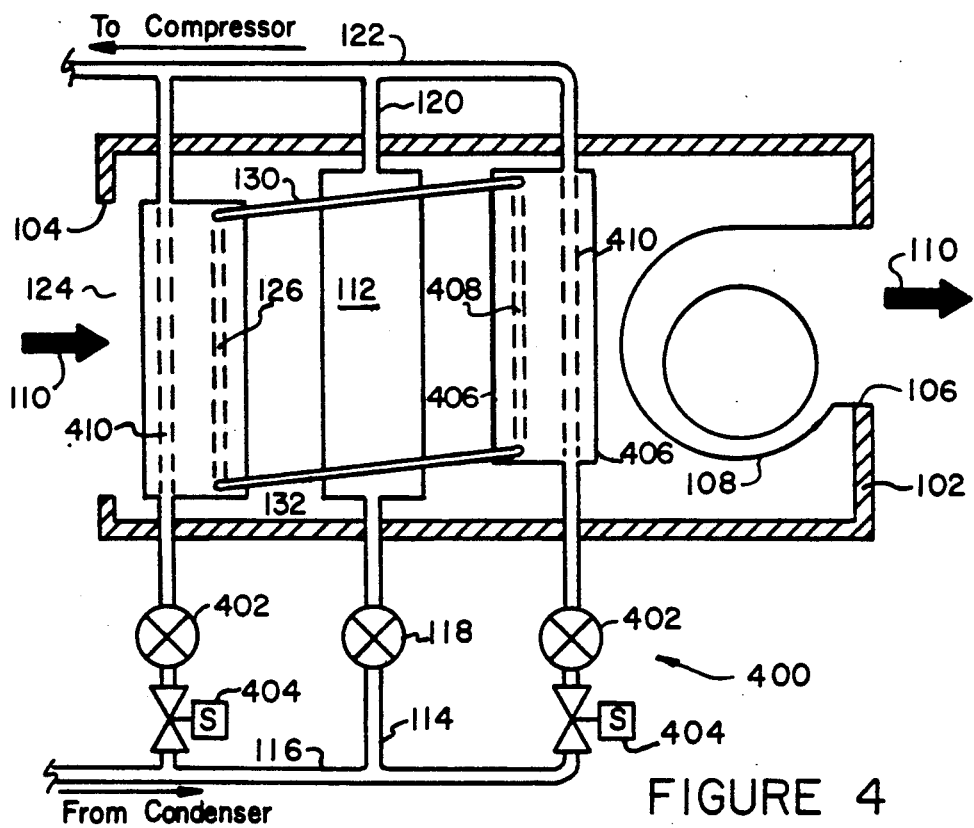
FIG. 4 is a schematic elevation view, shown partially in cross-section, of a third embodiment of the invention.
Figure 5:
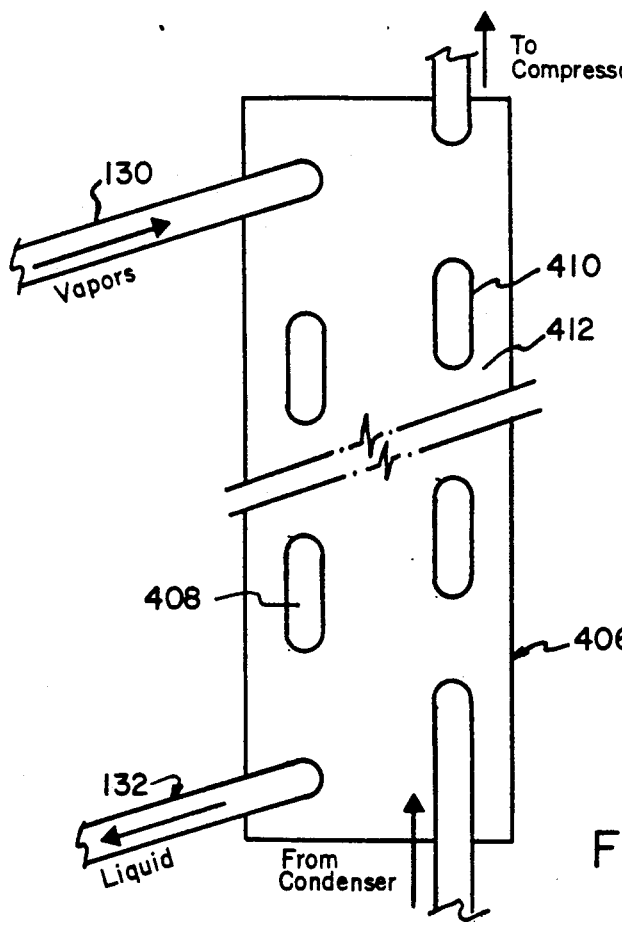
FIG. 5 is an enlarged view of a portion of the device illustrated in FIG. 4.

Yet another way of neutralizing the heat pipe heat exchanger is to combine the coil comprising the condenser of the heat pipe heat exchanger and a secondary evaporator in a single unit as illustrated in FIGS. 4 and 5.

The neutralizing device 400 of this embodiment connects a secondary evaporator 410 and the condenser 408 or evaporator 126 of the heat pipe heat exchanger 124 together to form a single unit 406. The unit 406 comprises two coils, one of which forms the secondary evaporator 410 and the other of which forms the condenser 408. As illustrated in FIG. 5, the coils are connected by common fins 412 which provide a thermal bond between the coils 408 and 410. As in the first two embodiments, a pilot actuated solenoid valve 404 is selectively actuatable to supply condensed refrigerant to the secondary evaporator 410 via an expansion device 402.

If desired, multiple heat pipe heat exchanges could be provided stacked one-on-top of the other. In this case, a single unit 406 incorporating a single evaporator coil 410 could be provided for all heat pipe heat exchangers.

Although the illustrated unit 406 includes serpentine coils for both coils 408 and 410, one or both of the coils could be replaced by a different configuration so long as the two coils are connected to common fins which provide a thermal bond between the coils.

The operation of the third embodiment of the invention will now be described with reference to FIGS. 4 and 5.

When the system is operated during cool and humid hours when maximum dehumidification is desired, the solenoid valve 404 is switched to its closed position in which it prevents the flow of refrigerant through evaporator 410. Since there is no other heat sink present to neutralize the condenser 408 of heat pipe heat exchanger 124, the condenser 408 transfers heat to air passing through the housing in the normal manner. Thus, the coil forming the condenser 408 will reheat the dehumidified air as discussed above in connection with the first and second embodiments.

When the system is operated during hot and dry hours when the full cooling capacity of the system 100 is desired, solenoid valve 404 will be switched to its open position to allow refrigerant to flow through the coil forming the secondary evaporator 410. The secondary evaporator will act as a heat sink and draw heat off from the refrigerant in the condenser 408, thus deactivating the condenser and preventing or at least inhibiting heat transfer from the air to the condenser. At the same time, by simultaneously absorbing heat from the heat pipes and from the air flowing through the housing 102, the secondary evaporator 410 effectively combines with the primary evaporator 112 to form an oversized evaporator. In fact, the whole assembly of the heat pipe heat exchanger and the secondary evaporator act as a secondary cooling coil which lowers further the temperature of the air flowing through the housing. For example, in a typical operation in which air enters the housing 102 at a temperature of 80° F., the air will be cooled to 75° F. by evaporator 126, 60° F. by the primary evaporator 112, and 55° F. by the secondary evaporator 410 of the unit 406.

As can thus be seen, the formation of the secondary cooling coil increases both the temperature of the evaporator and the suction pressure within the evaporator, resulting in an increase in overall system capacity and efficiency. In a typical operation, the evaporator temperature will increase by 5°–10° F., the pressure of the Freon ® refrigerant will increase by 8–15 PSI, and the capacity and efficiency of the system will increase by 10–18%.

Figure 6:
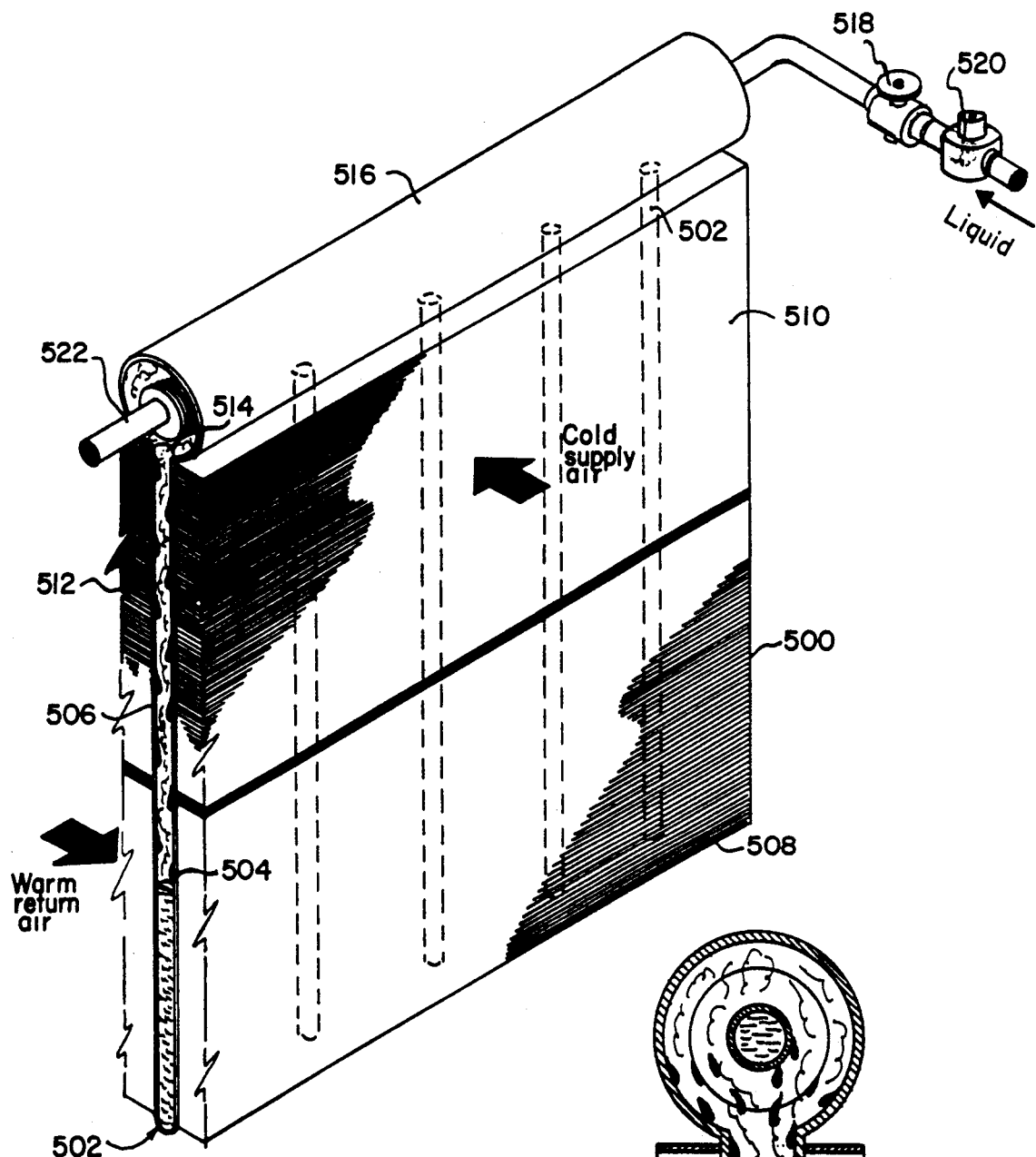
FIG. 6 is a perspective view of a modification of the system illustrated in FIG. 3.

Referring to FIG. 6, a modification of the device illustrated in FIG. 3 uses a plurality of unitary heat pipes 502 of a heat pipe heat exchanger 500 in place of separate condenser and evaporator coils. Each heat pipe 502 includes an evaporator portion 504 and a condenser portion 506, and is specially constructed so that refrigerant condenses along the edge of the pipe and drains down into evaporator portion 504, where it is vaporized by the heat of warm air flowing through the evaporator portion 508 of the heat pipe heat exchanger. The vaporized refrigerant rises into the condenser portion 506 where it is condensed by the cool air flowing through a condenser portion 510 of the heat exchanger. The individual heat pipes 502 are connected by a plurality of cooling fins 512 which increase the heat transfer efficiency of the device. The tubes may have internal rifling or micro-grooves acting as wicks. The construction and operation of the individual heat pipes 502 is, per se, well known in the art.

The upper ends 514 of the heat pipes 502 are connected to an annular heat exchanger which is similar in operation to the heat exchanger 306 of FIG. 3. Although the ends 514 of the heat pipes could be sealed and welded or otherwise connected to the heat exchanger 516 to provide conductive heat transfer between the heat pipes and the annular heat exchanger, more efficient heat exchange is achieved if the ends 514 of heat pipes 502 are opened to allow direct contact between the refrigerant and the annular interior of the heat exchanger. A solenoid valve 520 is provided which, when opened, allows the passage of liquid refrigerant through a an expansion device 518 and into a conduit 522 forming the center of the annular heat exchanger.

In operation, warm air flowing through the evaporator portion 508 of heat exchanger 500 will first be cooled by evaporator portions 504 of heat pipes 502. If valve 520 is open, refrigerant in evaporator portions 504, having been vaporized by the warm air, rises into annular heat exchanger 502, where it transfers heat to refrigerant in conduit 522 and is condensed, and drains back into the condenser portion 510 of the heat exchanger. As in the previous embodiments, the liquid refrigerant in the condenser portions 506 of the heat pipes 502 now causes the condenser portion 510 of the heat exchanger to act as a secondary evaporator absorbing some heat from the air flowing through portion 510. The liquid refrigerant then flows into the evaporator portion 508 of the heat exchanger, where the process is repeated.

As in the previous embodiments, normal operation of the heat pipe heat exchanger can be resumed by de-energizing solenoid valve 520 so that no heat exchange takes place in heat exchanger 516. If this is the case, the refrigerant will transfer heat to the air flowing through the condenser portion 510 of the heat exchanger and will condense within the heat pipes, and the condenser portions 506 of heat pipes 502 will perform the normal reheat function of the heat pipe heat exchanger.

Figure 7:
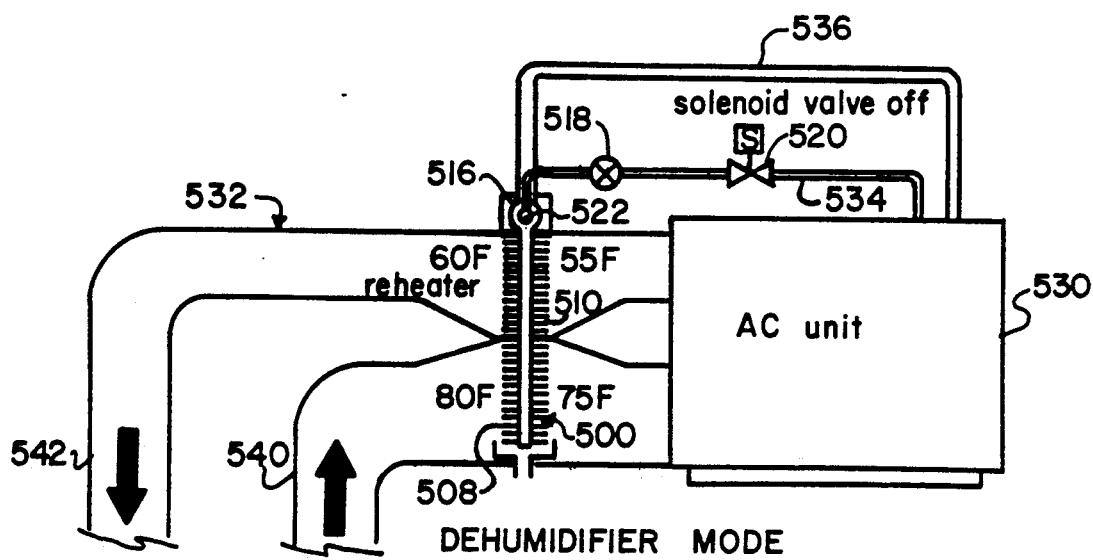
FIG. 7 is a schematic elevation view of an existing air conditioning system into the duct work of which the controllable heat pipe of FIG. 6 is retrofitted.
Figure 8:
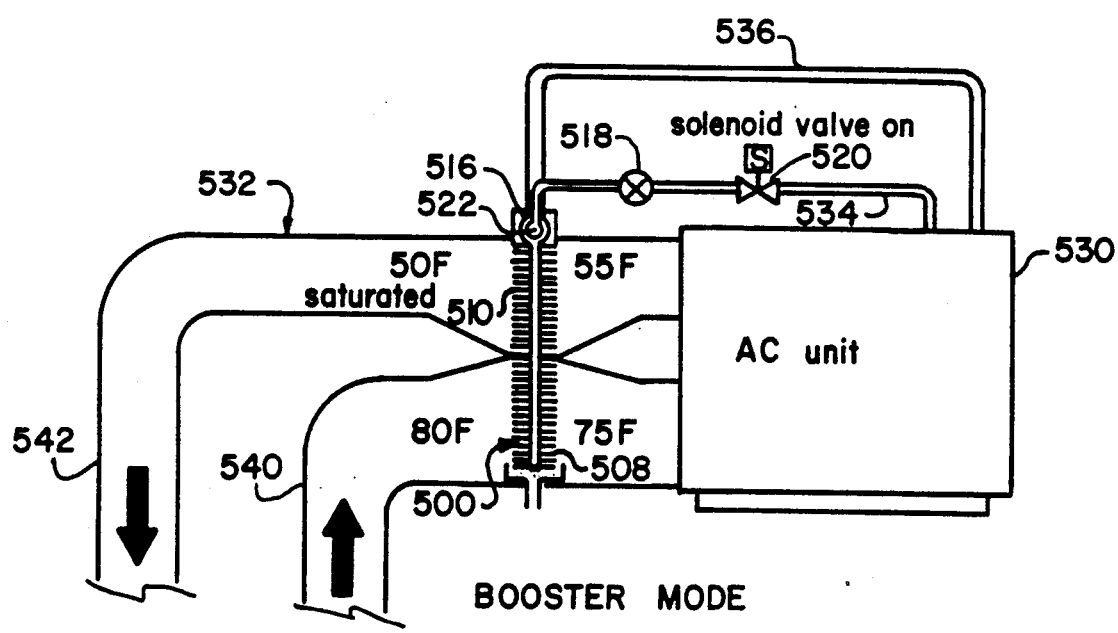
FIG. 8 illustrates the system of FIG. 7 in a second operational state.

Referring to FIGS. 7 and 8, the heat exchanger 500 of FIG. 6 may be retrofitted into the duct work 532 of an existing air conditioning system 530 by connecting the conduit 522 of annular heat exchanger 516 to the source of refrigerant of the air conditioning system 530 via lines 534 and 536. In such a system, the air conditioner of the system would correspond to and/or include the primary evaporator of the previous embodiments, and the inlet and outlet ducts would correspond to the inlet and the outlet of the housing. In the thus retrofitted system, the evaporator portion 508 of the heat pipe heat exchanger will be located in a warm air inlet duct 540 of the air conditioning system, and the condenser portion 510 will be located in the cool air outlet duct 542. When the solenoid valve is closed as illustrated in FIG. 7, the condenser portion 510 of the heat exchanger 500 will perform the normal reheat function and will warm the air exiting the system to a temperature of, e.g., 60° F. On the other hand, when the valve 520 is opened to allow the passage of refrigerant through conduit 522 of the annular heat exchanger 516 as illustrated in FIG. 8, the condenser portion 510 and the annular heat exchanger will act as a secondary evaporator and will cool the air exiting the system to a temperature of, e.g. 50° F.

While the controllable heat pipe heat exchanger of FIG. 6 is illustrated as the heat exchanger of FIGS. 7 and 8, other controllable heat pipe heat exchangers can be retrofitted into the duct work of an existing air conditioning system or directly into an existing air conditioner. One such heat pipe heat exchanger, illustrated in FIG. 9, utilizes a common fin connecting coiled heat exchangers in a manner similar to the embodiment of FIGS. 4 and 5.

The heat pipe heat exchanger 600 of this embodiment includes an evaporator coil 602 and a condenser coil 604 arranged one of above the other to form a single row of coils. A coil 608 of a secondary evaporator 606 is thermally connected to the coils 602 and 604 via common fins 610. Liquid refrigerant is selectively admitted through an expansion device 612 and into coil 608 by actuating a solenoid valve 614.

When the secondary evaporator 606 is not in use, e.g., during cool and humid hours, maximum dehumidification is provided by forcing warm air past the lower portion 616 of heat exchanger 600 where the air is cooled via heat transfer with refrigerant in evaporator coil 602. The refrigerant in the evaporator coil 602 is vaporized and flows out of the outlet 618 of the evaporator coil and into the inlet 620 of the condenser coil via a vapor conduit 622. The vaporized refrigerant is condensed in condenser coil 604 by reheating cool air flowing past an upper portion 624 of heat exchanger 600, and the thus condensed refrigerant flows out of an outlet 626 of condenser coil 604 and into an inlet 628 of evaporator coil 602 via a liquid return conduit 630.

When the solenoid valve 614 is opened to admit the flow of refrigerant through secondary evaporator coil 606 during hot and dry hours, the refrigerant flowing through this coil receives heat from the refrigerant in the condenser coil 604, thus neutralizing this coil and forming a secondary cooling coil as discussed above in connection with the embodiment of FIGS. 4 and 5.

Figure 9:
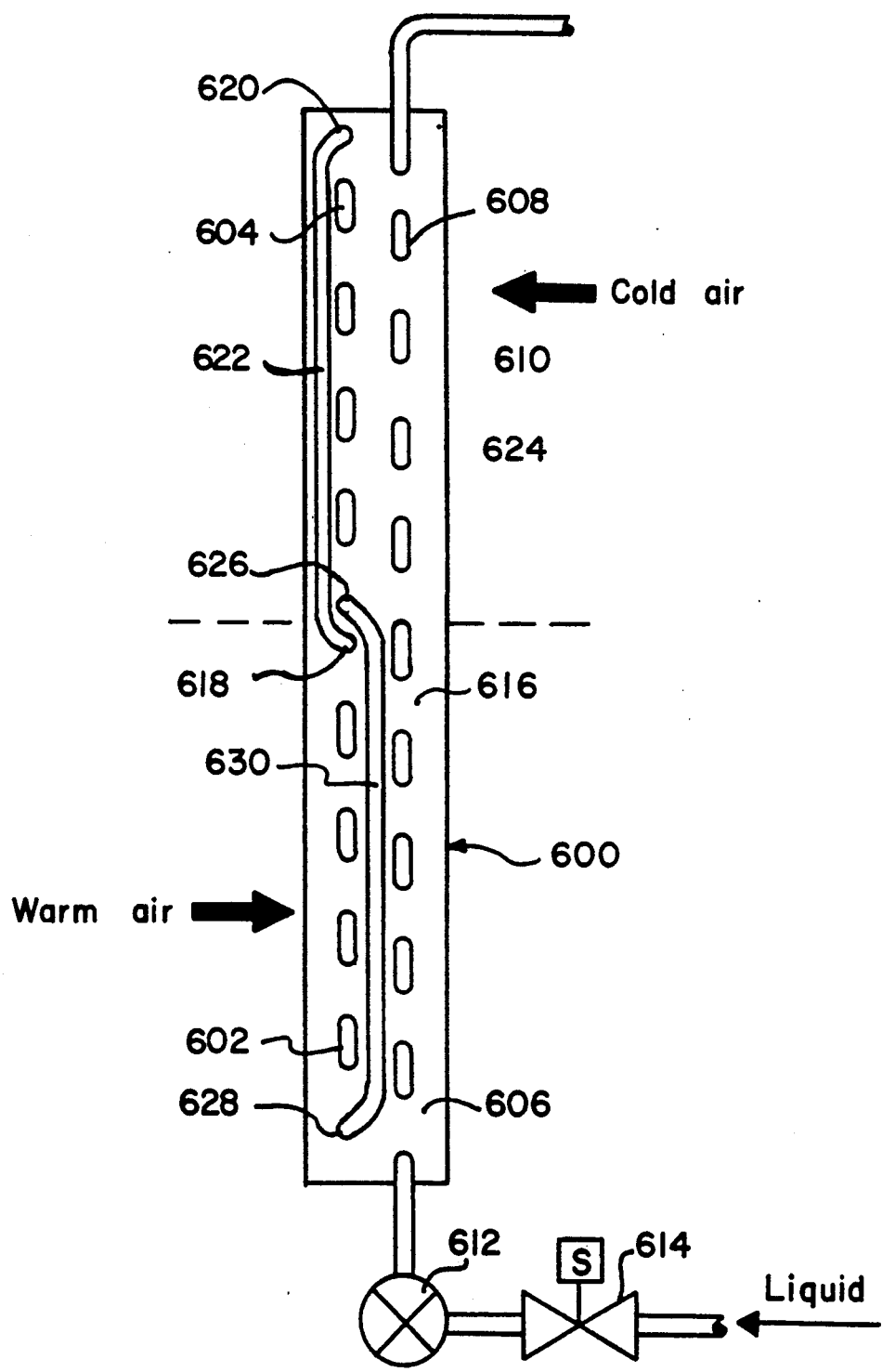
FIG. 9 is a schematic elevation view of a modification of the device illustrated in FIGS. 4 and 5.

Although FIG. 9 illustrates only a single heat exchanger 600 for the sake of convenience, in practice a plurality of such heat exchangers could be connected to one another via fins to form a heat exchanger similar to that illustrated in FIG. 6.

Although each of the embodiments described above utilizes a vaporizable refrigerant such as Freon ® as its working fluid, a liquid refrigerant such as chilled water can also be used as the coolant. In this case, the evaporators and condensers would be replaced by chilled water circuits. The solenoid valve of each embodiment can be switched to its open position by a humidistat upon the detection of a predetermined low humidity level. Alternatively, the solenoid valve could be controlled by a thermometer which switches the valve to its open position upon the detection of a predetermined air temperature.

In addition, hot water or gasses can be fed through the extra circuits of the first and third embodiments when only dehumidification is wanted without air-conditioning. Of course, the hot fluid can also be used in this context to heat the air flowing through the housing.

Although each of the embodiments described above incorporates a heat pipe heat exchanger having a single coil in each component, the same principal applies to multiple row configurations. In addition, interspaced rows of heat pipes and evaporators could be provided. Alternatively, a single row assembly could be provided with some pipes being used for evaporators and adjacent pipes being used as the heat pipes.

What is claimed is:

1. An apparatus comprising:
   (A) a housing having an inlet and an outlet;
   (B) means for drawing air through said housing from said inlet to said outlet;
   (C) primary cooling means, located within said housing, for cooling said air as said air flows through said housing;
   (D) means for cooling said air before said air reaches said primary cooling means;
   (E) means for reheating said air after said air is cooled by said primary cooling means; and
   (F) means for selectively at least partly neutralizing at least said means for reheating;
   wherein
      said means for cooling comprises an evaporator located between said inlet and said primary cooling means and
      said means for reheating comprises a condenser located between said primary cooling means and said outlet;
   wherein said means for neutralizing comprises a secondary evaporator located between said condenser and said outlet;
   wherein said secondary evaporator and said condenser are connected by fins which provide a thermal bond between said secondary evaporator and said condenser and said evaporator and said condenser are operatively connected to each other to form a heat pipe:

2. The apparatus of claim 1, further comprising a tertiary evaporator and wherein said tertiary evaporator and said evaporator are connected by fins which provide a thermal bond between said tertiary evaporator and said evaporator.

3. An apparatus comprising:
   (A) a housing having an inlet and an outlet;
   (B) a blower which draws air through said housing from said inlet to said outlet;
   (C) a primary evaporator which is located within said housing and which cools said air as said air flows through said housing;
   (D) a heat pipe heat exchanger comprising
      an evaporator which is located between said inlet and said primary evaporator and which cools said air before said air cooled by said primary evaporator, and
      a condenser which is located between said primary evaporator and said outlet and which reheats said air after said air is cooled by said primary evaporator; and
   (E) a selectively actuatable neutralizing device which, when actuated, at least partly neutralizes the effect of said condenser;
   wherein said neutralizing device comprises a secondary evaporator located between said condenser and said outlet;
   wherein said secondary evaporator and said condenser are connected by fins which provide a thermal bond between said secondary evaporator and said condenser and said evaporator and said condenser are operatively connected to form a heat pipe.

4. The apparatus of claim 3, further comprising a tertiary evaporator and wherein said tertiary evaporator and said evaporator are connected by fins which provide a thermal bond between said tertiary evaporator and said evaporator.

* * * * *